(12) United States Patent
Hausler et al.

(10) Patent No.: US 9,126,642 B2
(45) Date of Patent: Sep. 8, 2015

(54) TAILGATE HINGE ASSEMBLY

(71) Applicant: FORD GLOBAL TECHNOLOGIES, LLC, Dearborn, MI (US)

(72) Inventors: Henry W. Hausler, Manchester, MI (US); Andrew Kammerzell, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 75 days.

(21) Appl. No.: 13/721,281

(22) Filed: Dec. 20, 2012

(65) Prior Publication Data

US 2014/0175826 A1 Jun. 26, 2014

(51) Int. Cl.
*B62D 33/027* (2006.01)
*B62D 33/037* (2006.01)
*E05D 7/10* (2006.01)

(52) U.S. Cl.
CPC .......... *B62D 33/0273* (2013.01); *B62D 33/037* (2013.01); *E05D 7/1005* (2013.01); *E05D 2007/1027* (2013.01); *E05Y 2900/544* (2013.01)

(58) Field of Classification Search
CPC ............. B62D 33/0273; B62D 33/037; E05D 7/1005; E05D 2007/1027; E05Y 2900/544
USPC ........................................................ 296/57.1
See application file for complete search history.

(56) References Cited

U.S. PATENT DOCUMENTS

| 932,980 | A | 8/1909 | Giermann |
| 1,384,212 | A | 7/1921 | Price |
| 1,450,364 | A | 4/1923 | Gray |
| 2,742,317 | A | 4/1956 | Chandler |
| 3,734,560 | A | 5/1973 | Cramblet |
| 3,848,918 | A | 11/1974 | Dyer |
| 4,178,657 | A | 12/1979 | Way, Jr. |
| 5,350,213 | A | 9/1994 | Bernardo |
| 6,616,207 | B2 | 9/2003 | Mizuta |
| 7,284,781 | B2 | 10/2007 | Grant |
| 7,690,710 | B2 * | 4/2010 | Townson et al. ............. 296/57.1 |
| 2002/0000736 | A1 | 1/2002 | Musso |

* cited by examiner

*Primary Examiner* — Glenn Dayoan
*Assistant Examiner* — Melissa A Black
(74) *Attorney, Agent, or Firm* — Jason Rogers; MacMillan, Sobanski & Todd, LLC

(57) ABSTRACT

A vehicle having a tailgate attached by hinge assemblies. The hinge assemblies have a pair of first hinge halves secured to a rear sill with a hinge leaf extending rearwardly, and a pair of second hinge halves, each secured to the tailgate with a pair of double hinge plates extending therefrom. Each of the second hinge halves include a hinge pin mounted thereto that is selectively slidable between a removal position, a locked position where each of the hinge pins extends into hinge pin holes in the second hinge halves and hinge pin holes of the first hinge halves to pivotally secure the tailgate to the vehicle, and an install position where a tapered end of each of the hinge pins is located in a gap. A latch secures the tailgate in a closed position and releases the tailgate for pivoting about the hinge pins.

13 Claims, 5 Drawing Sheets

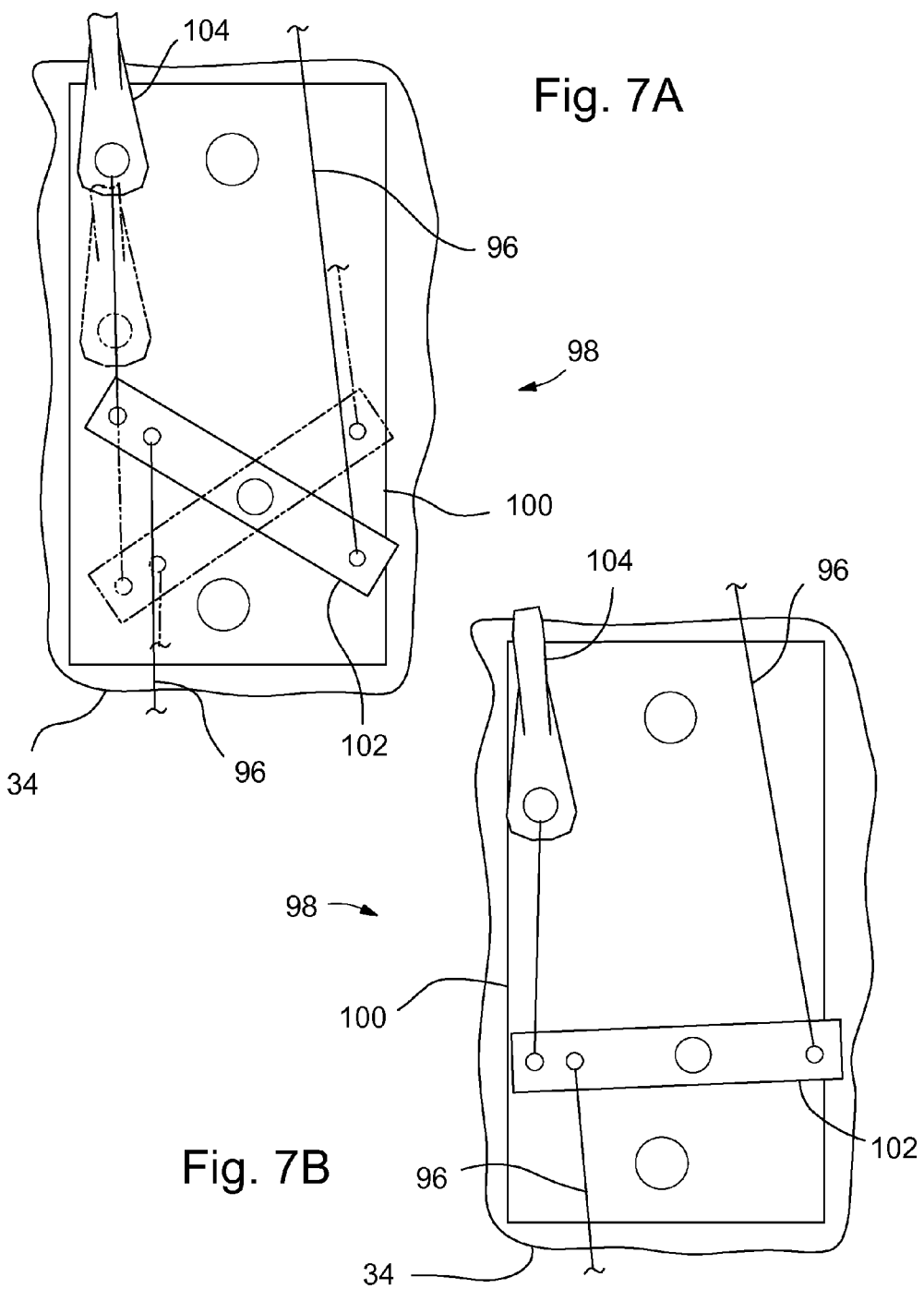

TAILGATE HINGE ASSEMBLY

BACKGROUND OF INVENTION

The present invention relates to a truck having a cargo box with a tailgate, and more particularly to a hinge assembly for the tailgate that allows for pivoting as well as removal of the tailgate from the truck.

For typical pickup trucks, the rear of the cargo box is closed with a tailgate. These tailgates pivot between a closed position (vertical) and an open position (horizontal) while mounted on a pair of hinges. The tailgate and the hinges are also designed to allow the tailgate to be completely removed from the vehicle. The hinges are mounted on the D-pillars and the sides of the tailgate near the bottom. The hinges are typically a cup-and-socket design, which provides ease of tailgate removal but has a somewhat loose fit (i.e., side-to-side free play) that allows for side-to-side movement of the tailgate in the cargo box opening during vehicle use. This movement may cause rattling sounds and potentially reduce the durability of the hinge assembly. The amount of free play is affected by tolerances during vehicle assembly and sometimes requires added shims to reduce the free play. This undesirably adds to the assembly process.

SUMMARY OF INVENTION

An embodiment contemplates a vehicle having a cargo box including a rear sill, a tailgate, a pair of first hinge halves, a pair of second hinge halves and a latch assembly. The rear sill extends laterally and defines a rear end of a floor of the cargo box. The tailgate extends laterally and pivotally attaches across a rear opening of the cargo box. The pair of first hinge halves are spaced laterally apart and each includes a base secured to the rear sill and a hinge leaf extending rearwardly from the base, with each of the hinge leaves including a hinge pin hole. The pair of second hinge halves each includes a base secured to the tailgate and a pair of double hinge plates extending from the base of the second hinge half, with each of the double hinge plates located and spaced apart to form a gap that receives a corresponding one of the hinge leaves, each of the double hinge plates including hinge pin holes that align with a corresponding one of the hinge pin holes in the hinge leaves, and with each of the second hinge halves including a hinge pin slidably mounted thereto and selectively slidable between a removal position where the hinge pins are essentially completely slid out of the respective gap and allow the tailgate to be separated from the vehicle, a locked position where each of the hinge pins extends into both of the hinge pin holes in the respective second hinge halves and the hinge pin holes of the respective first hinge halves to pivotally secure the tailgate to the vehicle, and an install position where a tapered end of each of the hinge pins is located in the respective gap. The latch assembly selectively secures the tailgate in a closed position and releases the tailgate to allow for pivoting of the tailgate about the hinge pins from the closed position to an open position.

An advantage of an embodiment is that the hinge assemblies mount the tailgate to the vehicle with less free play. The reduced free play may reduce the incidences of tailgate rattling sounds and improve the durability of the tailgate and hinge assemblies. The hinge assemblies and the tailgate are also relatively easy to assemble to the vehicle. In addition, the tailgate can quickly and easily be removed from the vehicle, and without the need for tools. And, the hinge pins remain mounted to the tailgate, even when the tailgate is removed from the vehicle, thus eliminating the possibility of misplacing the hinge pins.

BRIEF DESCRIPTION OF DRAWINGS

FIG. 7A is a schematic plan view, with the tailgate open, looking at a hinge release assembly, with a release lever shown in the locked position with solid lines and in the removal position with the phantom lines.

FIG. 7B is a schematic view similar to FIG. 7A, but with the release lever shown in the install position.

DETAILED DESCRIPTION

Figure 1:
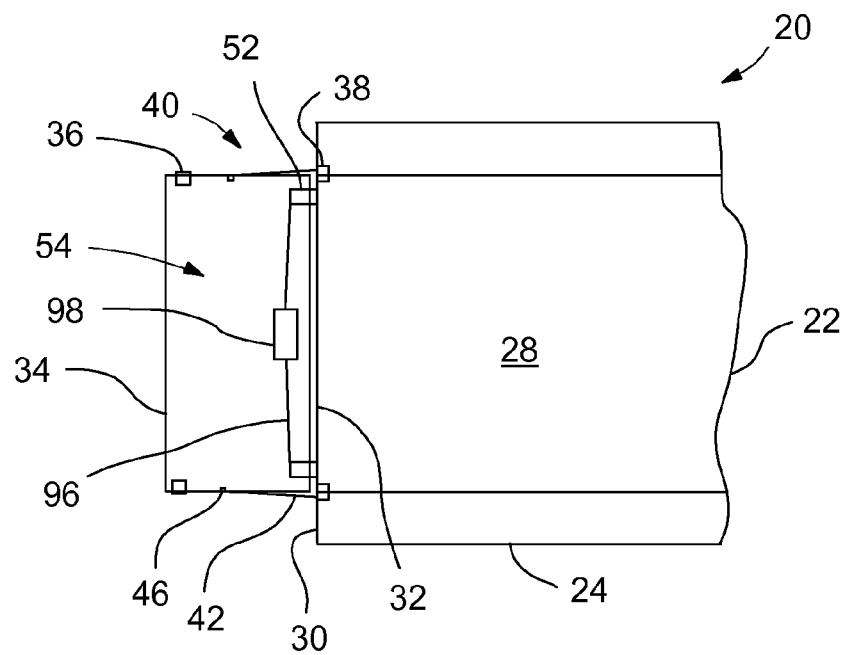
FIG. 1 is a schematic plan view of a rear portion of a pickup truck with the tailgate open.
Figure 2:
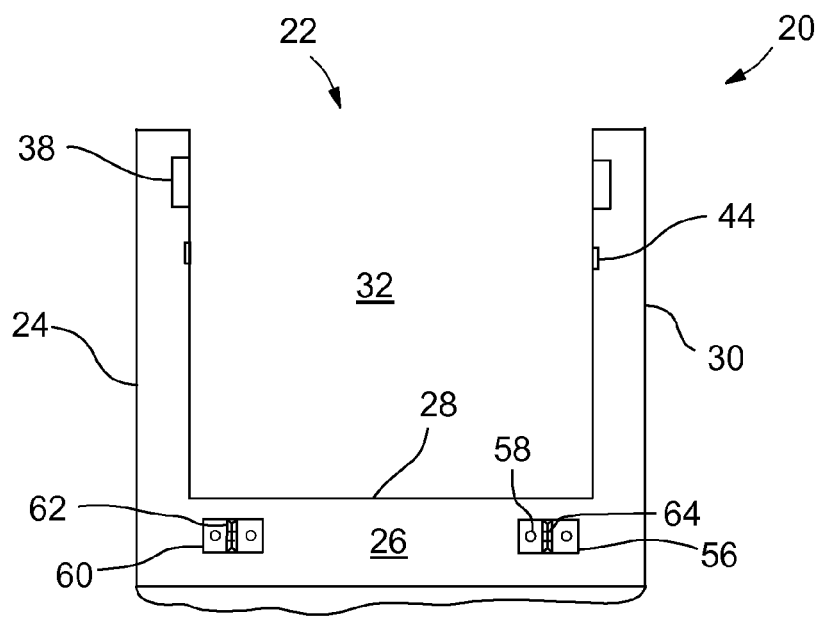
FIG. 2 is a schematic view looking forward at a portion of the rear end of the pickup truck, with the tailgate not shown.
Figure 3:
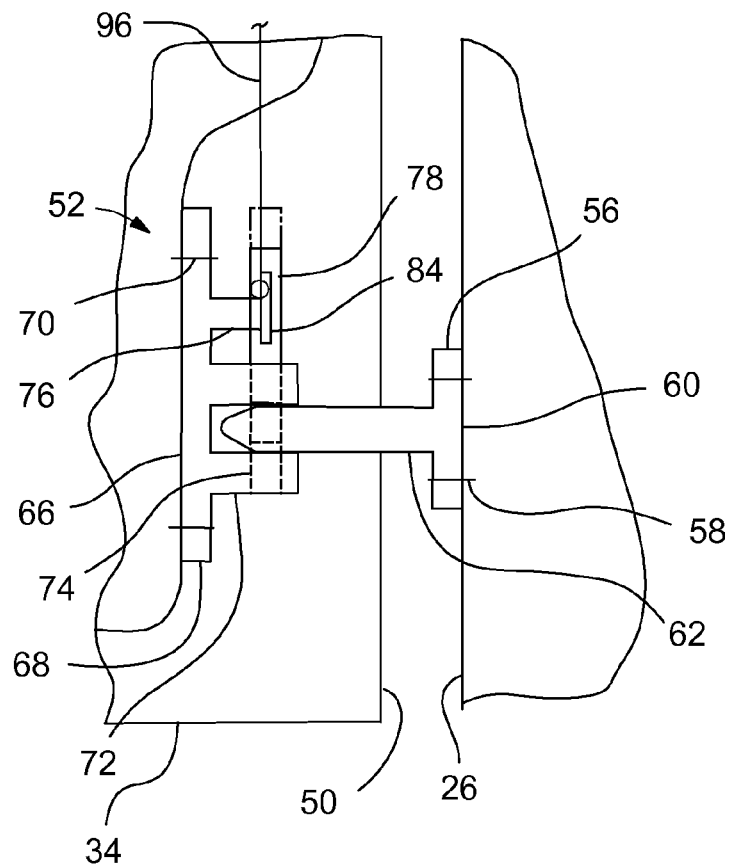
FIG. 3 is a schematic plan view of a portion of a hinge assembly supporting the tailgate on the pickup truck, without a hinge lever shown.
Figure 4A:
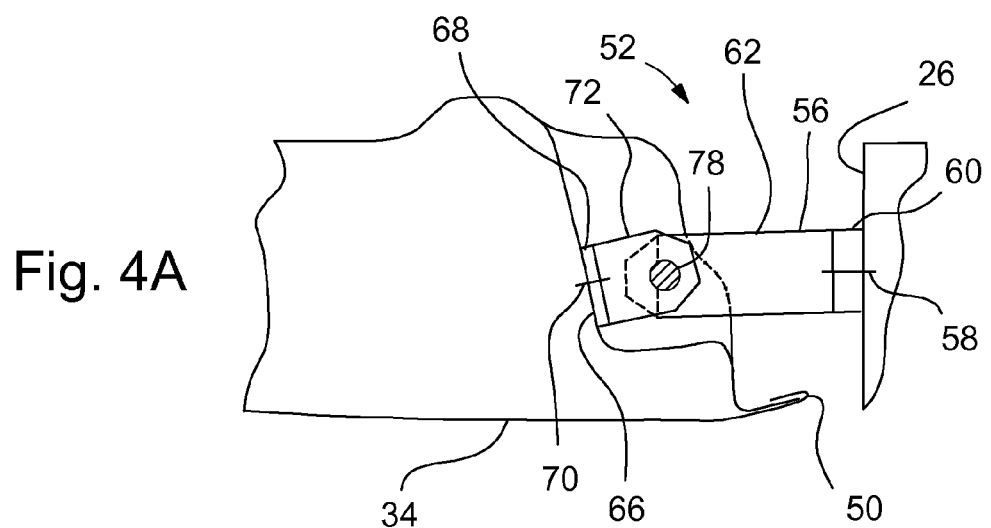
FIG. 4A is a schematic, side, partial section view of the hinge assembly and tailgate, with the tailgate in the open position.
Figure 4B:
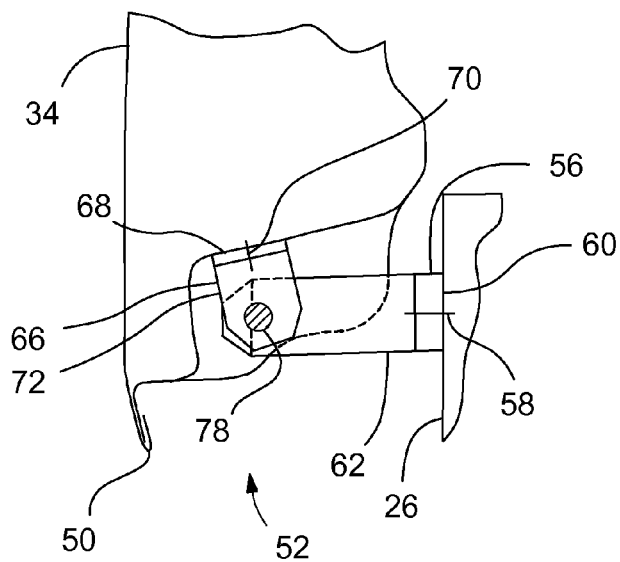
FIG. 4B is a view similar to FIG. 4A, but with the tailgate shown in the closed position.

FIGS. 1 and 2 illustrate a vehicle 20, such as, for example a pickup truck, which may include a cargo box 22 defined by side walls 24 and a rear sill 26 extending laterally across the rear of the cargo box 22, with a floor (bed) 28 extending laterally between the side walls 24 and to the rear sill 26 at the rear end of the floor 28. D-pillars 30 form the rear end of the side walls 24 and, with the rear sill 26, define a rear opening 32 of the cargo box 22.

A tailgate 34 pivotally mounts to the rear sill 26 and is pivotable between an upright oriented closed position that closes off the rear opening 32 and a horizontally oriented open position that leaves the rear opening unobstructed for loading cargo into the cargo box 22. The tailgate 34 may include tailgate latches 36 that engage strikers 38 mounted to the D-pillars 30 to form tailgate latch assemblies 40, which selectively hold the tailgate 34 in the closed position. Support cables 42 may attach at first ends to the D-pillars 30 at cable attachment mounts 44 and at their other ends to the tailgate 34 at cable attachment mounts 46 in order to support the tailgate 34 when in the open position. The tailgate latch assemblies 40 and support cables 42 may be conventional, if so desired, and so will not be discussed in more detail herein. The term "latch" and "latches" as used herein refer to securing the tailgate 34 to vehicle structure in the closed position or releasing the tailgate 34 to allow for pivoting to the open position—the tailgate 34 is not configured to pivot about the latches 36 or strikers 38 between the open and closed positions, it pivots about hinge assemblies, discussed below.

FIGS. 1-7B will now be discussed relative to releasably supporting the tailgate 34 to the rear sill 26 of the vehicle 20. The bottom end 50 of the tailgate 34 is pivotally and removably attached to the rear sill 26 via a pair of hinge assemblies 52, which form part of a hinge securement assembly 54.

While FIGS. 1 and 2 show the locations for both hinge assemblies 52, portions of only one of the two hinge assemblies 52 are shown in FIGS. 3-6. However, the pair of hinge assemblies may be essentially mirror images of each other (shown as located schematically in FIG. 1), so the disclosure of the hinge assembly details in FIGS. 3-6 apply to both hinge assemblies.

Figure 6:
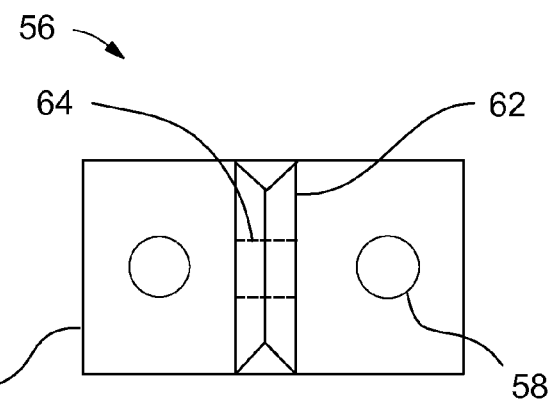
FIG. 6 is a schematic view looking forward at a box half of the hinge assembly.

The hinge assemblies 52 each include a first (truck side) hinge half 56 that is mounted to the rear sill 26 using fasteners 58 or some other type of securement means, such as for example welding. Each of the first hinge halves 56 includes a mounting base 60 through which the fasteners 58 extend to secure the base 60 against the rear sill 26. While the mounting bases 60 are shown as separate from the rear sill 26, they may be integral to the rear sill 26, if so desired. Extending rearward from each of the bases 60 is a hinge leaf 62, which includes a hinge pin hole 64 (the hole is best seen in FIGS. 2 and 6). The rear end of each of the hinge leaves 62, along with the hinge pin holes 64, selectively secure a second (tailgate side) hinge half 66 portion of the hinge assembly 52.

Each of the second hinge halves 66 include a mounting base 68 secured, via fasteners 70 or by other means, to the tailgate 34, and a pair of double hinge plates 72 extending forward from the mounting base 68. While the mounting bases 68 are shown as separate from the tailgate structure, they may be integral to the tailgate 34, if so desired. Each pair of the double hinge plates 72 is located and spaced apart to form a gap 73 to receive a corresponding one of the hinge leaves 62 between the plates of each pair (best seen in FIG. 3), and each of the double hinge plates 72 includes hinge pin holes 74 that align with corresponding hinge pin holes 64 of the hinge leaves 62 when the two hinge halves 56, 66 are aligned.

Each of the second hinge halves 66 also include a mounting boss 76 upon which a hinge pin 78 is slidably mounted. The respective mounting boss 76 aligns the hinge pin 78 to allow for sliding of the hinge pin 78 into and out of the corresponding hinge pin holes 64, 74. Each of the hinge pins 78 includes a tapered engagement end 80 (best seen in FIGS. 5A and 5B) that slides into and out of the corresponding hinge pin holes 64, 74, with the tapered side facing toward the corresponding hinge leaf 62. Each hinge pin 78 also includes a support slot 84 that slidably secures the hinge pin 78 to its respective mounting boss 76. In addition, each hinge pin 78 also includes a lever slot 86 for receiving a first end 88 of a corresponding one of a pair of hinge levers 90.

Each hinge lever 90 is pivotally mounted to a respective one of the second hinge halves 66, with springs 92 biasing each hinge lever 90 to push the corresponding hinge pin 78 toward the corresponding hinge pin holes 64, 74. A second end 94 of each of the hinge levers 90 is connected to one of a pair of corresponding rods 96, the other ends of which are connected to a hinge release assembly 98.

The hinge release assembly 98 (best seen in FIGS. 1, 7A and 7B) is part of the hinge securement assembly 54 and may be mounted on the tailgate 34 midway between the two hinge assemblies 52. A brain plate 100 may be mounted to the tailgate 34 with a release lever 102 pivotally attached to the brain plate 100. The rods 96 extending from each of the hinge assemblies 52 attach near opposite ends of the release lever 102. A release handle 104 is attached to the release lever 102 and can pivot the release lever 102 when pulled on by a person.

Figure 5A:
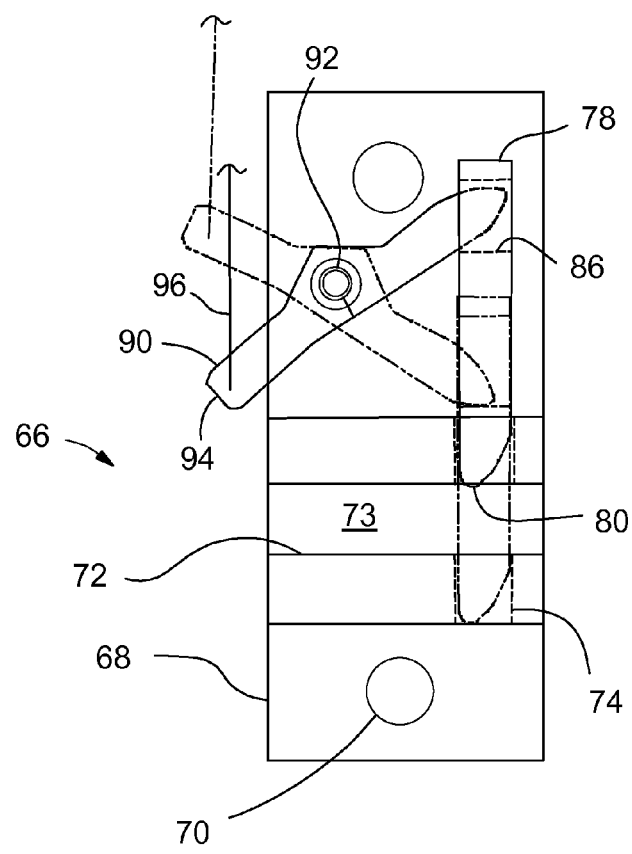
FIG. 5A is a schematic view, looking rearward when the tailgate is in an open position, of a tailgate portion of the hinge assembly (but not the tailgate) showing the hinge pin and hinge lever in the removal position with solid lines and in the locked position with phantom lines.
Figure 5B:
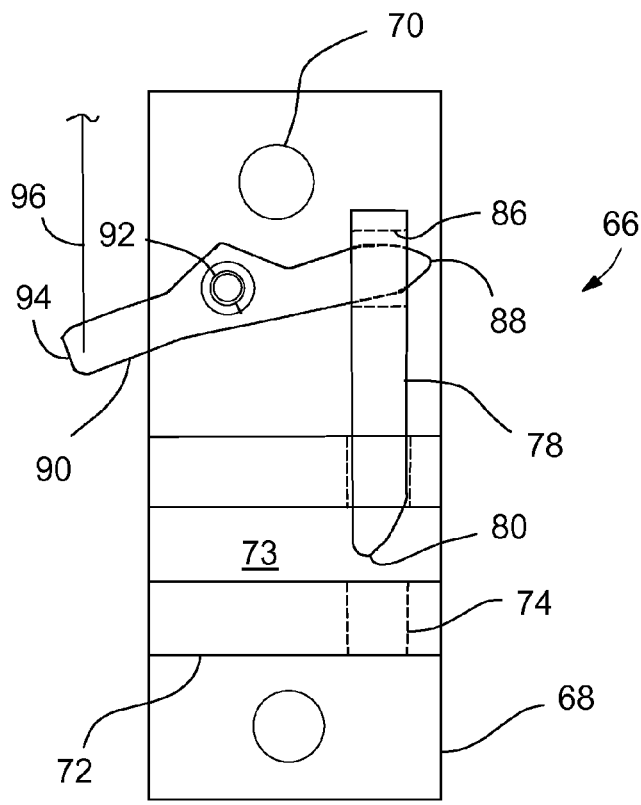
FIG. 5B is a view similar to FIG. 5B, but with the hinge pin and hinge lever shown in the install position.

The operation of the hinge securement assembly 54 for installing and removing the tailgate 34 from the vehicle will now be discussed. The assembly 54 creates three positions in which the hinge pins 78 may be located. A tailgate removal position is shown in solid lines in FIG. 5A and in phantom lines in FIG. 7A. A tailgate locked position is shown in phantom lines in FIG. 5A and in solid lines in FIG. 7A. An install position is shown in FIGS. 5B and 7B.

When removing the tailgate 34 from the vehicle 20, the release handle 104 is moved to cause the release lever 102 to pivot to the tailgate removal position (phantom lines in FIG. 7A). This causes the rods 96 to move, pulling the hinge pins 78 to their tailgate removal positions (solid lines in FIG. 5A). In this removal position, each hinge pin 78 is pulled toward the center of the tailgate 34 (laterally relative to the vehicle centerline) so that each of the tapered ends 80 are essentially completely recessed out of the corresponding gaps 73. This allows the hinge leaves 62 to be pulled away from the double hinge plates 72, thus allowing one to pull the tailgate 34 away from the vehicle 20. The support cables 42 and tailgate latch assemblies 40 may be conventional and may be released from the vehicle 20 in a conventional fashion and so will not be discussed in detail herein.

One will note that, while the tailgate 34 is removed from and may be stored separate from the vehicle 20, the hinge pins 78 stay mounted to the second hinge half 66 and so will not risk being lost when one wishes to mount the tailgate 34 to the vehicle 20.

To install the tailgate 34 onto the vehicle 20, one moves the release handle 104 to cause the release lever 102 to pivot to the tailgate install position (FIG. 7B). This causes the rods 96 to move, pulling the hinge pins 78 to their tailgate install positions (FIG. 5B). In this install position, each hinge pin 78 is pulled toward the center of the tailgate 34 (laterally relative to the vehicle centerline) so that essentially only the tapered ends 80 extend into the corresponding gaps 73.

This install position allows one to maneuver the tailgate 34 until the hinge leaves 62 are aligned with the corresponding gaps 73 between the double hinge plates 72, and then push the hinge leaves 62 into the gaps 73. As the hinge leaves 62 are pushed into the gaps, the hinge leaves 62 will engage the tapered ends 80, causing the hinge pins 78 to temporarily slide out of the way against the bias of the springs 92 until the hinge pin holes 64 in the first hinge halves 56 align with the hinge pin holes 74 in the second hinge halves 66. At this point, the springs 92 will cause the hinge pins 78 to snap back to their install position, and, with the taper on only one side, the hinge leaves 62 will be trapped between the double hinge plates 72. One can then let go of the tailgate 34 without the tailgate being able to fall off the vehicle 20.

At this point, one moves the release handle 104 to cause the release lever 102 to pivot to the tailgate locked position (solid lines in FIG. 7A). This causes the rods 96 to move, pulling the hinge pins 78 to their tailgate locked positions (phantom lines in FIG. 5A). In this locked position, each hinge pin 78 is pushed away from the center of the tailgate 34 (laterally relative to the vehicle centerline) so that the hinge pins 78 extend entirely across the corresponding gaps 73, with the tapered ends 80 in the most outboard plates of the double hinge plates 72. The hinge assemblies 52 in the locked positions assure that the tailgate 34 will stay secured to the vehicle 20 during operation, while still allowing the tailgate 34 to pivot freely between the open and closed positions.

Since the support cables 42 and tailgate latch assemblies 40 may be conventional, they may be secured in a conventional fashion and so will not be discussed in detail herein.

As an alternative, the hinge securement assembly may have a separate release lever adjacent to each hinge assembly rather than a single, centrally located hinge release assembly.

The operations related to removing and mounting the tailgate to the vehicle are essentially the same as above, except that one needs to move each of the separate release levers to the desired positions rather than only move a single, central release lever. While this uses extra steps during removal and mounting, the alternative essentially eliminates the need for the rods extending between the hinge assemblies and the hinge release assembly.

While certain embodiments of the present invention have been described in detail, those familiar with the art to which this invention relates will recognize various alternative designs and embodiments for practicing the invention as defined by the following claims.

What is claimed is:

1. A vehicle having a cargo box comprising:
    a rear sill extending laterally and defining a rear end of a floor of the cargo box;
    a tailgate extending laterally and pivotally attached across a rear opening of the cargo box;
    a pair of first hinge halves spaced laterally apart and each including a base secured to the rear sill and a hinge leaf extending rearwardly from the base, each of the hinge leaves including a hinge pin hole;
    a pair of second hinge halves, each including a base secured to the tailgate and a pair of double hinge plates extending from the base of the second hinge half, each of the double hinge plates located and spaced apart to form a gap that receives a corresponding one of the hinge leaves, each of the double hinge plates including hinge pin holes that align with a corresponding one of the hinge pin holes in the hinge leaves, and each of the second hinge halves including a hinge pin slidably mounted thereto and selectively slidable between a removal position where the hinge pins are essentially completely slid out of the respective gap and allow the tailgate to be separated from the vehicle, a locked position where each of the hinge pins extends into both of the hinge pin holes in the respective second hinge halves and the hinge pin holes of the respective first hinge halves to pivotally secure the tailgate to the vehicle, and an install position where a tapered end of each of the hinge pins is located in the respective gap; and
    at least one latch assembly configured to selectively secure the tailgate in a closed position and release the tailgate to allow for pivoting of the tailgate about the hinge pins from the closed position to an open position.

2. The vehicle of claim 1 wherein each of the second hinge halves includes a spring operatively engaging a respective one of the hinge pins to bias the hinge pins toward the respective gaps.

3. The vehicle of claim 1 including a hinge release assembly operatively engaging the hinge pins to control movement of the hinge pins between the locked, removal and install positions.

4. The vehicle of claim 3 wherein the hinge release assembly includes a release lever pivotally mounted to the tailgate between the pair of second hinge halves, and a first rod operatively connected between the release lever and a first one of the second hinge halves and a second rod operatively connected between the release lever and a second one of the second hinge halves.

5. The vehicle of claim 4 wherein the hinge release assembly includes a release handle operatively engaging the release lever and configured to cause the release lever to be moved between a release lever removal position, a release lever install position, and a release lever locked position.

6. The vehicle of claim 3 wherein each of the second hinge halves includes a spring operatively engaging a respective one of the hinge pins to bias the hinge pins toward the respective gaps.

7. The vehicle of claim 1 wherein the cargo box includes a pair of longitudinally extending sidewalls, each having a D-pillar at a rear end thereof, with the rear sill extending between the D-pillars.

8. The vehicle of claim 7 wherein the at least one latch assembly is two latch assemblies, a portion of each of the latch assemblies mounted to a respective one of the D-pillars.

9. The vehicle of claim 1 wherein each of the hinge pins includes a lever slot and each of the second hinge halves includes a hinge lever pivotally mounted to the respective bases of the second hinge halves and having a first end extending into the respective lever slots, the hinge levers configured to be pivotable to move the hinge pins between the removal, locked and install positions.

10. The vehicle of claim 9 wherein each of the second hinge halves includes a spring mounted to and operatively engaging the respective hinge lever to bias the hinge pins toward the respective gaps.

11. The vehicle of claim 9 including a hinge release assembly operatively engaging the hinge levers to control movement of the hinge pins between the locked, removal and install positions.

12. The vehicle of claim 11 wherein the hinge release assembly includes a release lever pivotally mounted to the tailgate between the pair of second hinge halves, and a first rod operatively connected between the release lever and a first one of the hinge levers and a second rod operatively connected between the release lever and a second one of the hinge levers.

13. The vehicle of claim 12 wherein the hinge release assembly includes a release handle operatively engaging the release lever and configured to cause the release lever to be pivoted between a release lever removal position, a release lever install position, and a release lever locked position.

* * * * *